March 22, 1955  A. F. HICKMAN  2,704,568
RESILIENT SEAT SUSPENSIONS
Filed Oct. 8, 1949  4 Sheets-Sheet 1

INVENTOR.
Albert F. Hickman
BY
Popp and Popp
Attorneys.

March 22, 1955    A. F. HICKMAN    2,704,568
RESILIENT SEAT SUSPENSIONS
Filed Oct. 8, 1949    4 Sheets-Sheet 2

INVENTOR.
Albert F. Hickman
BY
Popp and Popp
Attorneys.

United States Patent Office 2,704,568
Patented Mar. 22, 1955

2,704,568

RESILIENT SEAT SUSPENSIONS

Albert F. Hickman, Eden, N. Y., assignor to Hickman Industries, Inc., Eden, N. Y., a corporation of New York Application October 8, 1949, Serial No. 120,239

11 Claims. (Cl. 155—50)

This invention relates to a resilient seat suspension and more particularly to such a seat suspension designed for use with extremely rough riding vehicles such as farm tractors and military vehicles, the seat suspension also being applicable for use in railroad locomotives.

This invention is an improvement on the seat suspension disclosed in my copending application for seat suspension, Serial No. 746,678, filed May 8, 1947, now Patent No. 2,590,859, dated April 1, 1952.

In common with my said copending application, important objects of the present invention are to provide a seat suspension, (1) in which the seat part is permitted to move against a geometric resilient resistance, both laterally and vertically, relative to the vehicle on which the seat is mounted; (2) which provides the maximum safety and comfort and leaves the occupant in full control of all controls of the vehicle; (3) in which the seat moves with the occupant and is not drawn or jerked away from the occupant whenever the pressure imposed by the occupant upon the seat becomes negative; (4) which will operate in a desirable frequency range regardless of the weight of the occupant; (5) which can be designed, within practicable limits, to have any desired frequency and any desired resistance curve; (6) which reduces and cushions both the vertical and lateral impacts against the seated occupant without imposing undue thrusts on the connections between the seat part and the vehicle; (7) in which torsion springs are employed to provide a longer and variable spring resistance range; (8) in which the resilient support is provided by torsion springs which are simple, compact, low in cost and have long life and freedom from service difficulties; (9) in which geometric resilient resistance is obtained in a compact structure which requires no lubrication and is free from noise; (10) in which the load from the seat to the suspension and from the suspension to the base part of the seat structure is distributed at a plurality of spaced points; (11) in which both fore-and-aft and lateral tilting of the seat is prevented; (12) which is made of a plurality of low cost and sturdy subassemblies which can be easily coupled together; (13) which includes a simple and low cost shackle structure; and (14) which is extremely compact and sturdy and which will stand up under conditions of severe and constant use with very little servicing.

A specific object of the present invention is to provide such a suspension in which each side of the seat part is supported by one of a pair of generally parallel crank shafts and in which both sides of the seat part are compelled to move in unison through a simple and effective connection therebetween which is free from pivot joints.

Another specific object is to provide such a seat suspension in which each side of the seat part is supported by one of a pair of generally parallel crank shafts having individual torsion springs and in which a simple, effective and readily adjusted mechanism is provided for simultaneously adjusting the initial tension or wind up of the torsion springs.

Another specific object is to provide, in such a suspension having generally parallel crank shafts and shackles connecting the seat part of the structure with a base part thereof, connections including the shackles which permit the parts to be arranged compactly without interference with one another and with uniform distribution of the load to and without corner loading of any of the bearings, that is, without tendency for the journalled part to cock and exert other than a radial pressure on the bearing.

Another specific object of the invention is to provide a simple and inexpensive shackle in which the bearings can be identical with the main bearings of the suspension and in which corner loading of the shackle bearings is avoided.

Another object is to provide, in such a suspension having generally parallel crank shafts and shackles, a hydraulic shock absorber having a simple and inexpensive connection with the suspension to effectively cushion undue rebound or downward movement of the seat part.

Another object is to provide such a laterally cushioned seat having simple and effective stops for positively limiting the lateral movement of the seat to prevent objectionable sidesway thereof.

Another object is to provide a simple and effective resilient bumper on which the seat bottoms.

Another object is to provide such a seat having rubber torsion springs having long life, provision being made, in particular, to prevent axial elongation of the rubber springs.

Other objects and advantages will appear from the following description and drawings in which:

Fig. 5 is an enlarged vertical section taken on line 5—5, Fig. 1.

Figure 1:
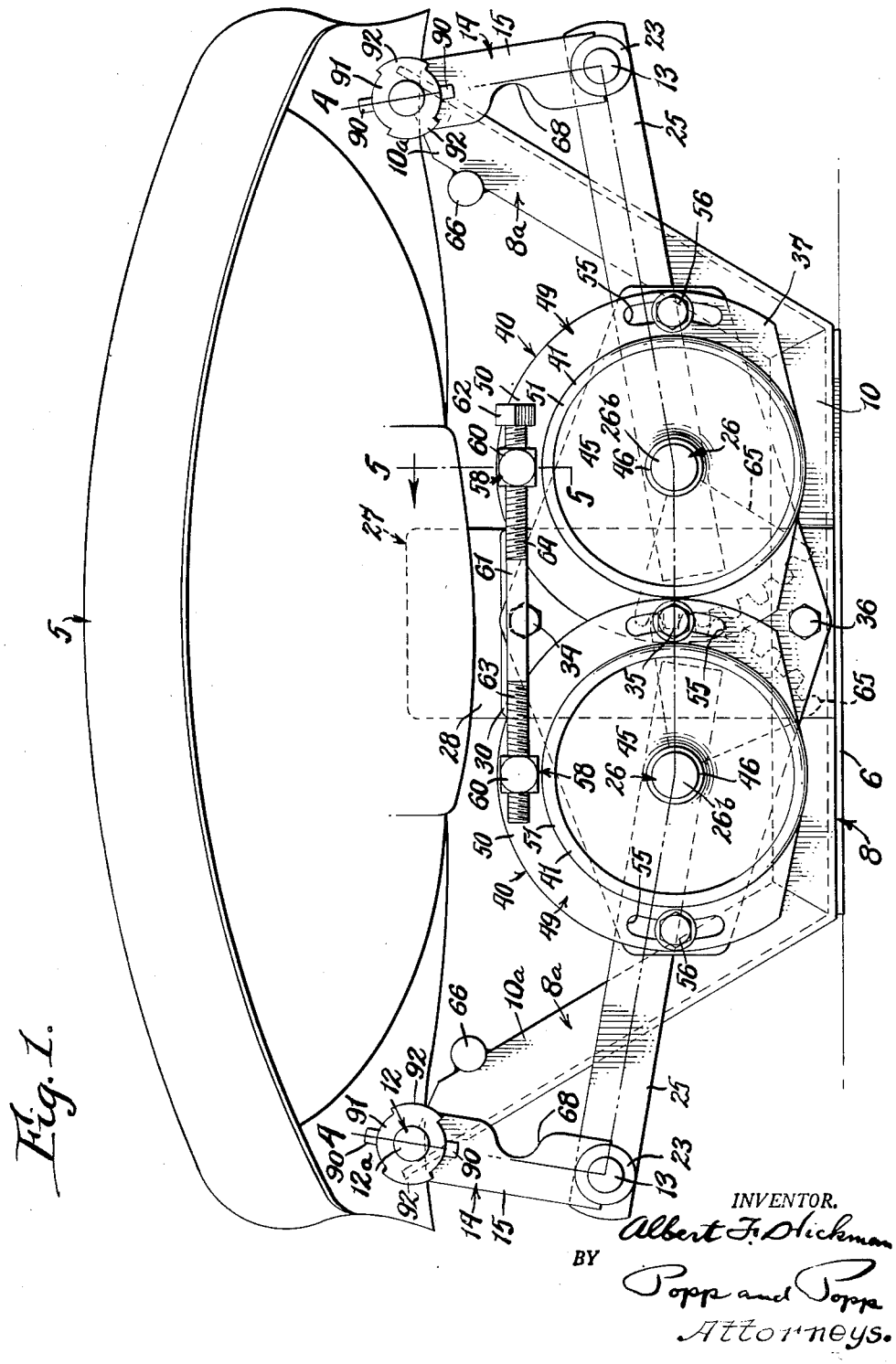
Fig. 1 is a rear elevational view of a seat structure having a suspension embodying the present invention, the seat part of this structure being shown in its extreme depressed position.
Figure 2:
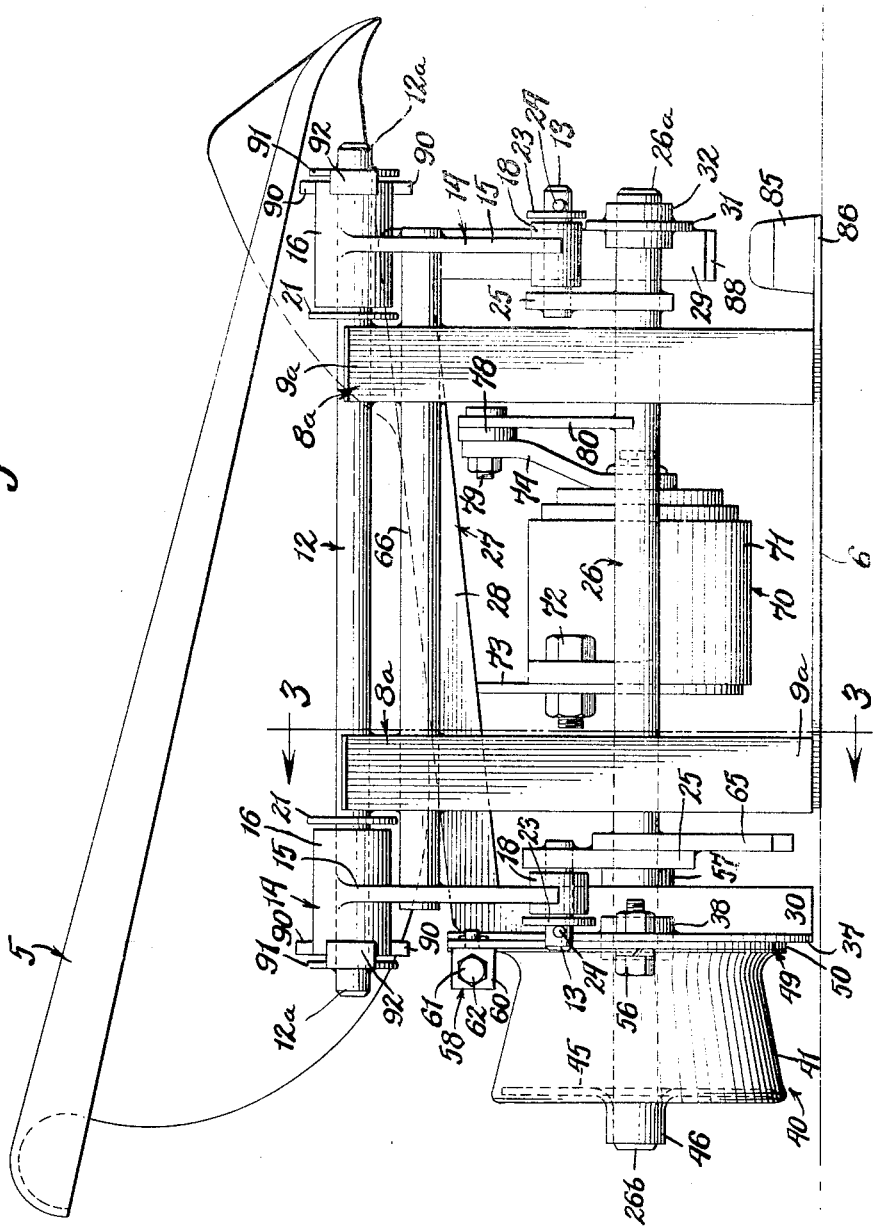
Fig. 2 is a side elevational view thereof.
Figure 3:
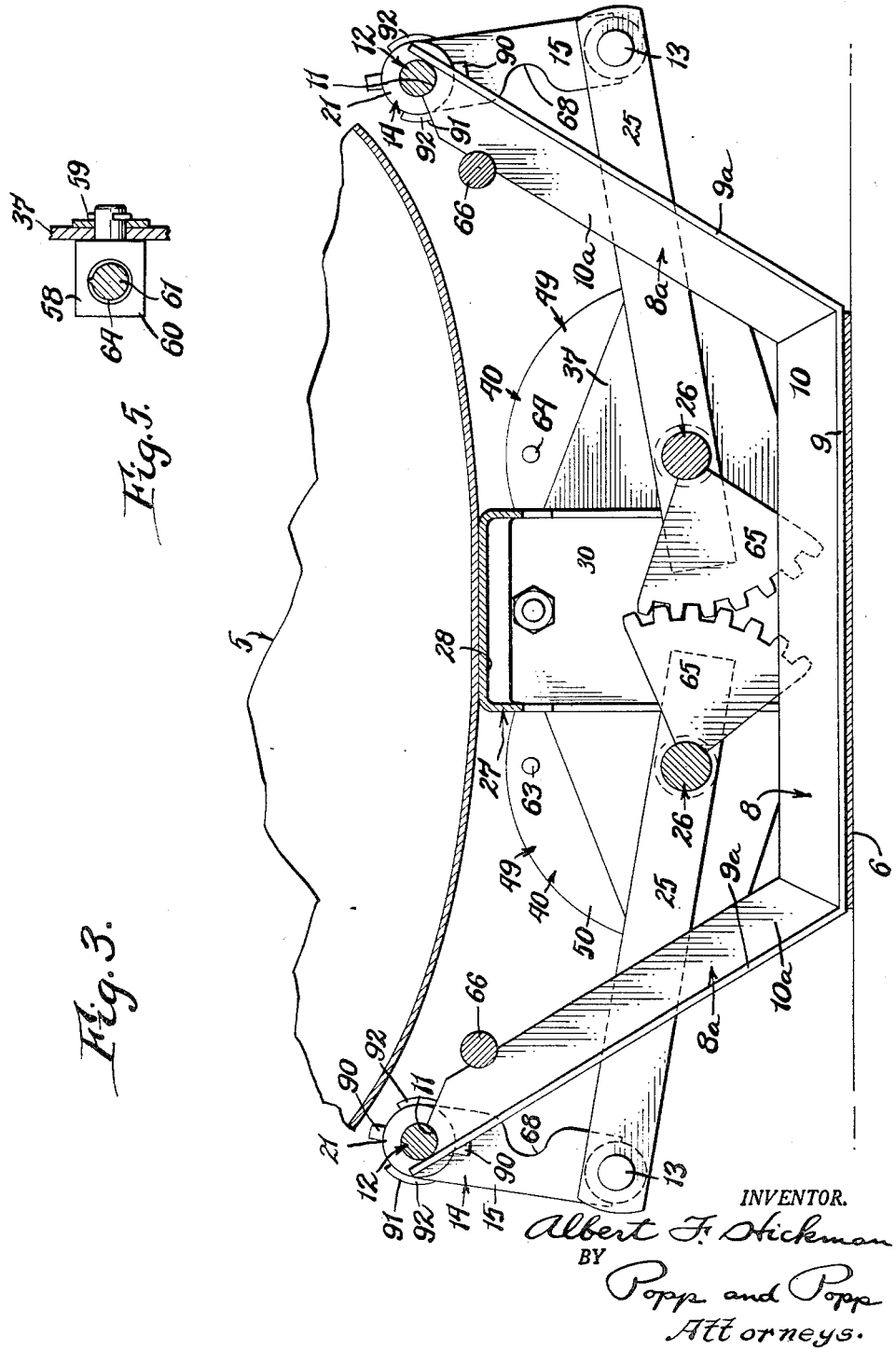
Fig. 3 is a fragmentary vertical transverse section taken on line 3—3, Fig. 2.

The seat suspension embodying the present invention is designed primarily for use where rough riding or extreme vertical and lateral impact conditions are encountered, such as with farm tractors, railroad locomotives and military vehicles, where lateral as well as vertical stability is required, and to this end the seat 5 is shown as being in the form of a sheet metal bucket type of seat or saddle and as carried by a horizontal base plate 6 of rectangular form which is adapted to be secured to the farm tractor or other vehicle on which the seat is used.

While the supporting structure of which the base plate 6 forms a part can be of any construction to suit the particular installation and use of the seat, in the form of this supporting structure as illustrated on both the forward and rearward extremity of the base plate 6 is welded or otherwise suitably secured a transverse bar 8 which is L-shaped in cross section to provide a flange 9 secured to the base plate 6 and a vertical flange 10. The opposite ends of each of these transverse bars 8, from points adjacent the sides of the base plate 6, are extended laterally upwardly and outwardly to form four posts 8a having flanges 9a and 10a which form continuations, respectively, of the flanges 9 and 10. It will be seen that this construction provides posts at the four corners of the base plate 6 which extend outwardly and upwardly therefrom and which provide a sturdy and simple mounting for the pivots of the seat suspension. As indicated, however, the precise form of the supporting structure is optional and forms no part of the present invention.

Figure 4:
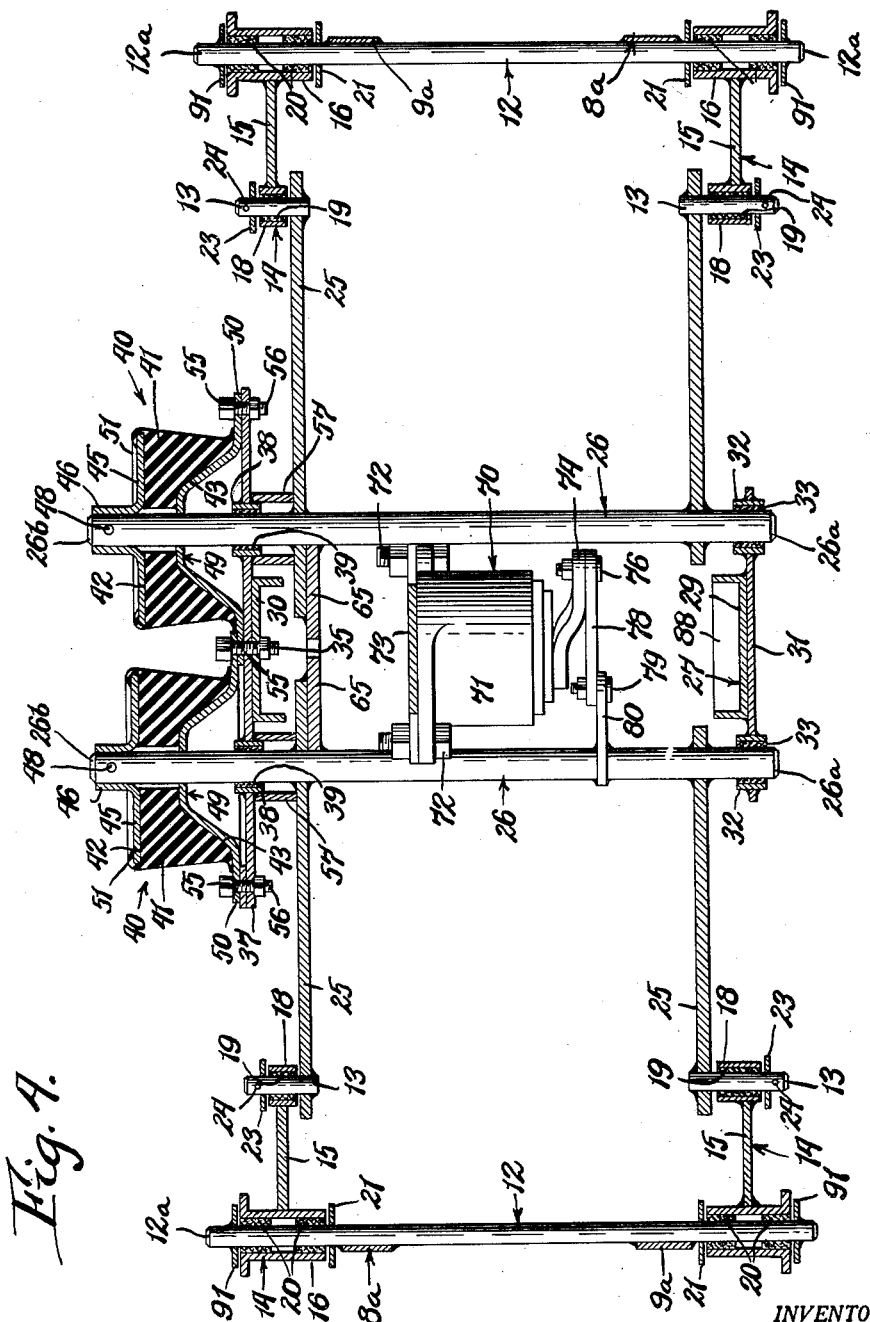
Fig. 4 is a laid out sectional view taken generally on line 4—4, Fig. 1.

The upper extremities of the vertical flanges 10a of the posts 8a are shown as cut to provide quarter-round seats 11 for a pair of fore-and-aft base rods 12, each of which is welded to the pair of posts 8a at the corresponding side of the seat. As best shown in Fig. 4, the ends 12a of these base rods 12 project beyond the posts 8a to provide base part pivot pins projecting fore-and-aft from the four corners of the base structure.

At each corner of the seat structure the corresponding base part pivot pin 12a is connected to a corresponding crank arm pivot pin 13 by a shackle indicated generally at 14. While these shackles can be of any suitable form, they are shown as including a flat metal plate or link 15, the upper end of which is provided with a half round recess in which is welded the center of a relatively long metal sleeve 16 and the lower end of which is similarly recessed to receive a shorter metal sleeve 18 which is similarly welded to the link 15. The shorter sleeve 18 contains a single bearing bushing 19 of lubricant impregnated material and in which the corresponding crank arm pivot pin 13 is journalled. The longer or upper metal sleeve 16 contains a pair of similarly lubricant impregnated bearing bushings 20 in which the corresponding base part pivot pin 12a is journalled. The bearing bushings 19 and 20 can be identical and for this purpose the inside diameters of the sleeves 16 and 18 are preferably the same.

The provision of the pair of spaced bearing bushings 20 for each base part pivot pin 12a is important to prevent undesirable so called corner loading of these bearings, that is, the imposition of forces other than radial upon these bearings due to misalinement of the pivot pins 12a with these bearings under service conditions. This provision for the pair of bearing bushings 20 between each base part pivot pin 12a and the corresponding shackle 14 also insures uniform distribution of the load at all four corners of the suspension and eliminates the need for interconnecting the pair of shackles at each side as with the connecting rod shown in my said Patent No. 2,590,859. This also eliminates the need for making each companion pair of crank arm pivot pins 13 from a common rod as with the suspension shown in this earlier patent. A washer 21 is shown as interposed between the bearing sleeve 16 of each shackle and the corresponding arm 8a of the base part 8 of the seat frame.

Each crank arm pivot pin 13 is welded to and extends laterally outwardly from the outer end of a corresponding crank arm 25. At each side of the seat structure the corresponding pair of crank arms 25 are apertured at their inner ends to receive the fulcrum rod 26 of the crank shaft to which this pair of crank arms are welded. The opposite ends of these fulcrum rods 26 project beyond the crank arms 25 to provide front and rear crank shaft pivot pins 26a and 26b which are pivotally connected to the sheet metal bucket seat 5.

For this purpose a bracket, indicated generally at 27, is provided which is channel shaped in cross section and has a central part 28 extending fore-and-aft and secured to the under side of the sheet metal bucket type seat 5 in any suitable manner, this bracket also having a depending front leg 29 and a depending rear leg 30. To the depending front leg 29 of the bracket 27 is welded a vertical cross plate 31 in which are welded a pair of sleeves 32 each carrying a bearing bushing 33 of lubricant impregnated material, in which the corresponding crank arm pivot pin 26a is journalled. To the depending rear leg 30 is secured, as by a vertical row of bolts 34, 35 and 36, a vertical cross plate 37 in which are welded a pair of sleeves 38 each carrying a bearing bushing 39 of lubricant impregnated material in which the corresponding crank arm pivot pin 26b is journalled.

It will be noted that since this rear cross plate 37 is removably secured to the depending rear leg 30 of the bracket 27, this plate together with its bearings 38, 39 can be removed rearwardly from the rear crank arm pivot pins 26b whereupon the bucket seat 5 together with its supporting bracket 27 can be slipped forwardly so as to remove the front pair of bearings 32, 33 from the forward crank arm pivot pins 26a, this leaving the bucket seat 5 and its supporting bracket 27 detached from the fulcrum rods 26 of the crank shafts.

The resilient support for the suspension is shown as being in the form of a pair of rubber torsion springs indicated generally at 40, and each of which is shown as secured to the corresponding rear crank arm pivot pin 26b. Each of these torsion springs can be of any suitable construction and is shown as comprising a conical body 41 of rubber having a flat outer face 42 and a concave inner face 43, this rubber body being provided with an oversize axial through bore through which the corresponding crank arm pivot pin 26b extends. To the outer flat face 42 of each rubber body 41 is vulcanized a metal disk 45 having a hub 46 which fits the extremity of the corresponding crank arm pivot pin 26b and can be secured thereto in any suitable manner as by the pin 48. To the opposite concave face of each rubber body is vulcanized a convex metal anchoring member or plate 49, this anchoring plate having an outwardly projecting marginal flange 50. For protection, the rear edge of the rubber body 41 preferably curls around the edge of and is vulcanized to the rear face of the disk 45 as indicated at 51.

Each rubber spring 40 is adjustably secured to the cross plate 37 and for this purpose its outwardly projected marginal flange 50 is provided, on diametrically opposite sides of the rubber spring, with a pair of slots 55 which are arranged concentric with the axis of rotation of the rubber spring. At the center of the seat structure, the arcuate slots 55 of the two rubber springs overlap and receive the central bolt 35. At the opposite sides of the rubber springs these arcuate slots 55 receive bolts 56 which extend through the outer ends of the transverse plate 37. It will be seen that loosening these bolts 56 and the central bolt 35 permits each rubber spring 40 to be rotated to the extent permitted by the length of the arcuate slots 55, thereby permitting the rubber springs to be adjusted to provide the desired initial degree of tension or wind up. After such adjustment has been obtained, these bolts can be tightened to hold the rubber springs 40 in the adjusted position.

With the rubber springs 40 so anchored and connected to the rods 26 of the suspension linkage, it was found that in use there was a tendency for the rubber bodies 41 of the springs to elongate axially. With such axial elongation of the rubber bodies of the rubber springs when put under torsion, some of the torsional forces were converted into shear. Such shear forces materially reduced the life of the rubber springs. To avoid such axial elongation, a pair of tubular spacers 57 which serve as thrust bearings are provided, each encircling the corresponding shaft 26 and interposed between the anchoring plate 37 for the rubber springs and the corresponding crank arm 25, as best shown in Fig. 4.

To permit of ready adjusting both of the rubber springs 40 to have the same initial degree of windup, these rubber springs are preferably interconnected so as to rotate in unison in making this adjustment.

For this purpose a swivel pin 58 is mounted in the upper part of the flange 50 of the convex metal anchoring plate 49 of each rubber spring 40 to rotate about a horizontal axis, these swivel pins being held in position by cotter pins 59 or in any other suitable manner and having a square head 60 disposed adjacent the rear face of this rim as best shown in Figs. 1 and 5. In these heads 60 are screwed a threaded adjusting rod 61, this rod having a head 62. The threads 63 at one end of the adjusting rod 61 and engaging the corresponding swivel pin head 60 are pitched in the opposite direction from the threads 64 at the opposite end of this rod. Accordingly on loosening the bolts 35 and 56 and turning the threaded rod 61 the swivel pins 58 are adjusted toward or from one another thereby to rotate the convex inner anchoring plates 49 of the two rubber springs 40 in opposite directions and establish an initial equal degree of windup for the two rubber springs, following which the bolts 35 and 56 can be tightened to hold this adjusted condition. If at this time the bucket seat 5 is unoccupied, this seat is biased upwardly its maximum extent, this being determined by engagement of the stop rods 66 with the shackle links 15. Therefore if the seat is unoccupied while the windup of the rubber springs is being adjusted by rotating these anchoring plates 49, the opposite plates 45 of these rubber springs are held stationary since they are fast to the fulcrum rods 26 which in turn are fast to the crank arms 25 which in turn are pivoted to the shackle links 15 so being held against the stop rods 66. Accordingly when the seat is unoccupied the only effect of turning the adjusting screw 61 is to adjust the degree of windup of the rubber bodies 41 by turning the anchoring plates 49 of these bodies, their opposite plates 45 being held stationary. Of course, if the seat 5 is occupied, as illustrated in the drawings, turning the adjusting screw 61 to increase the windup of the rubber bodies 41 will raise the occupant slightly and turning the adjusting screw 61 the other way will lower the occupant slightly. This raising or lowering is through the train of elements comprising the anchoring plates 49 being adjustably rotated relative to the bucket seat 5 by the screw 61, the rubber bodies 41, the opposite plates 45, the fulcrum rods 26, the crank arms 25 fast to these fulcrum rods, and the shackle structures 14 to the base 10.

While a seat constructed as above described provides a satisfactory ride in the service for which it is designed, under certain conditions it is desirable to have further provision against undue tipping of the seat laterally. This is accomplished by gears interconnecting the two fulcrum shafts 26 of the crank arms so as to rotate in unison. The gearing connecting the two fulcrum shafts 26 of the crank arms is shown as being in the form of intermeshing gear segments 65, each being made of a flat metal plate and welded to one pair of the crank arms 25, although these gear segments 65 could obviously be formed integrally with these crank arms 25 if desired. These gear segments insure that the rotation of either crank shaft effects an equal and opposite rotation of the other crank shaft, thereby insuring that the downward movement of one side of the sheet metal bucket type seat 5 will result in a corresponding downward movement of the other side thereof.

Under certain extreme conditions of operation there is a further possibility that even the gear segments 65 might fail to hold the bucket seat or saddle 5 from lurching. More specifically, if after encountering a bump, and the bucket seat or saddle rebounds to its maximum elevation, and if at this time the operator should press heavily with one foot on the usual brake pedal so as to impose a heavy lateral thrust on the elevated seat, there is a possibility that the bucket seat or saddle 5 could be thrown to an uncomfortable lurched position since at this time the crank arms 25 and shackles 14 would approach alinement between the shackles and crank arms. While such a situation has never arisen under service conditions, to limit the upward movement of the seat or saddle and hold the rubber springs 40 in the proper preloaded condition, a positive stop is provided for limiting inward movement of the shackles 14 when the bucket seat or saddle 5 is in its elevated position. For this purpose, a fore-and-aft rod 66 is welded to the inner edges of the vertical flanges 10a of the posts 8a at each side of the suspension. Each rod 66 forms a stop in the path of movement of the corresponding shackle link 15 and by the provision of recesses 68 in these shackle links 15, the shackle links are permitted movement of about 45° inwardly from a vertical position. It will be seen that these stop rods 66 leave the shackles 14 free to move outwardly and permit free laterally cushioned movement of the occupied seat or saddle 5 but check the inward movement of the shackles 14 at about 45° inside of a vertical line intersecting the base part pivot pins 12a. This permits the desired laterally cushioned movement of the seat under normal riding conditions but prevents tilting or lurching of the bucket or saddle seat 5 to an uncomfortable position when the seat is under the unusual conditions set forth, namely, in an extreme elevated position and subjected to a heavy lateral thrust.

To cushion the vertical movement of the seat, either against upward or downward movement, or both, a hydraulic shock absorber, indicated generally at 70, is provided. This shock absorber is shown as being of the rotary hydraulic type having a casing or body 71 secured by bolts 72 to a bracket 73 which is in turn secured to the central cross bar 28 of the bracket 27 directly supporting the sheet metal bucket seat or saddle 5. The operating arm 74 of the shock absorber is shown as extending upwardly and as pivotally connected by a bolt 76 to a horizontal link 78. The opposite end of this link 78 is shown as connected by a bolt 79 to an arm 80 fast to and extending upwardly from the fulcrum rod 26 of one of the crank shafts. It will be seen that by applying hydraulic resistance to the rotation of one of the rods 26, the movement of the entire suspension can be cushioned against either upward or downward impacts, or both.

It is also desirable to have a bumper to limit the downward movement of the seat. This bumper can be of any suitable form and is shown as a rubber bumper or knob 85 on a forward extension 86 of the base plate 6 and engaging a bottom plate 88 welded to the lower extremity of the forward depending leg 29 of the plate 28 carrying the bucket seat 5.

It has also been found desirable to provide a positive limit for the lateral or side sway movement of the bucket seat. For this purpose the upper tubular end 16 of each of the shackles 14 is provided with a pair of diametrically opposite, radially extending stop lugs 90 near the outer end of the corresponding pivot pin extension 12a. These tubular ends 16 are retained on these pivot pin extensions 12a by washer-like stop members 91 each fitted over the projecting end of the corresponding pivot pin extension 12a and welded thereto alongside the outer end of the tubular end 16 of the adjacent shackle 14. This washer-like stop member 91 has a pair of stop lugs 92 projecting axially from its edge over the adjacent end of the tubular shackle end 16 and into the path of the stop lugs 90 thereon. It will be seen, that referring particularly to Fig. 1, that if the bucket seat 5 is moved sufficiently far to the left or right, the stops 90 on the tubular ends 16 of the shackle 14 rotate to engage the stops 92 on the stop members 91 welded to the pivot pin extensions 12a, this engagement thereby preventing further movement of the bucket seat in such direction and hence limiting the side sway or lateral movement of the seat.

In the operation of the suspension, which is shown in its extreme depressed position, the upward movement of the base plate 6, through the posts 8a, base part pivots 12a, and shackles 14, swings the outer ends of the crank arms 25 upwardly, the fulcrum rods 26 of these crank arms oscillating about their bearings 33 and 39. These bearings are secured to the bracket 27 which carries the sheet metal bucket seat or saddle 5, the bearings 33 being carried by the plate 31 welded to the bracket and the bearings 39 being carried by the plate 37 removably secured to this bracket, the removability of the plate 37 permitting ready removal of the sheet metal bucket seat or saddle 5, together with its supporting bracket 27, from the suspension.

The rotation of each fulcrum rod 26 is yieldingly resisted by the pair of rubber springs 40 connected to the ends 26b thereof, this movement of each fulcrum rod 26 being transmitted from its end 26b to the outer end of the corresponding rubber body 41 through the pin 48, hub 46, and disk 45 vulcanized to the outer end face of the rubber body. The other end of each rubber body 41 is anchored to the convex anchoring plate 49 vulcanized to its inner face, and through the bolts 35 and 56 to the seat part of the seat structure. These bolts 35 and 56 extend through the arcuate slots 55 provided in the flanges 50 of the convex anchoring plates 49 of the rubber springs and hence on loosening these bolts it will be seen that the rubber springs can be rotated to have the degree of initial tension or wind up permitted by the length of the arcuate slots 55. With these bolts 35 and 56 so loosened, the initial tension or wind up of the two rubber springs can be adjusted by turning the headed adjusting screw rod 61 so as to spread or contract the two swivel pins 58 in the heads 60 of which the reversely threaded ends of the rod 61 are secured. Such turning of this threaded adjusting rod 61 operates to rotate the flanges 50 of the two rubber springs 40 and hence permits of adjusting the anchoring plates 49 of these rubber springs simultaneously and equally to provide the desired initial tension or wind up.

Lateral tipping of the seat or saddle 5 is prevented by the gearing interconnecting the crank arm fulcrum rods 26. These fulcrum rods are compelled to oscillate in unison through the segmental gears 65 which interconnect the same. Since the crank arms 25 at each side of the seat structure are connected by the shackles 14 with the corresponding sides of the base plate 6, it will be seen that the bucket seat or saddle 5 is prevented from tipping laterally by so compelling the fulcrum rods 26 of the crank shafts to rotate in unison. It will also be noted that by the simple provision of these segmental gears 65, the connection between the two crank shafts is simple and inexpensive.

At the same time the bucket seat or saddle 5 is capable of lateral movement and this movement is resisted by lateral cushioning. This lateral movement of the bucket seat or saddle 5 is permitted by the shackles 14 which, it will be noted, during the normal operating range of movement of the bucket seat or saddle 5, extend upwardly and inwardly from the crank arm pivot pins 13 to the base part pivots 12a. This upward and inward inclined arrangement of these shackles during the normal operating range of movement of the bucket seat or saddle 5, tends to cause the bucket seat or saddle 5 to centralize and stabilize itself in a direction transverse of the vertical and enables the action of gravity to geometrically and resiliently resist any such movement of the bucket seat or saddle 5 away from its centered position. This permits the bucket seat or saddle 5, together with the occupant thereof, to move substantially straight ahead despite a certain amount of lateral movement of the vehicle and the base plate 6 connected therewith.

When the base plate 6 is forced upwardly relative to the bucket seat or saddle 5, the effective opposing force of the rubber torsion springs 40 increases at a geometric rate and not at an arithmetic rate. In this particular case, the geometric rate is of the accelerated increase type in which increments of vertical movement of the base plate 6 are opposed by an accelerated rate of resilient resistance. This is primarily due to the progressive decrease in the effective leverage of the crank arms 25 as they swing upwardly and inwardly about their axes of rotation. This action is also influenced by the varying angularity of the shackles 14 and the fact that increments of vertical displacement of the pivot pins 13 cause accelerated rates of increase in the angular displacement of the rubber torsion springs 40. This latter is due to the fact that increments of vertical movement of said pivot pins 13 are not proportional to the accompanying increments of angular twist to which the rubber torsion springs 40 are subjected.

This geometric action also occurs when the base plate 6 moves downwardly relative to the bucket seat or saddle 5. Throughout this particular movement the geometric action is of the accelerated decrease type, that is, as the base plate 6 passes through increments of downward movement the rate of decrease of the resilient force tending to push the bucket seat or saddle 5 downwardly decreases.

By this means, so far as vertical forces are concerned, the bucket seat or saddle 5 is free to "float" along solely under the influence of gravity (plus whatever vertical momentum forces are present), this feature being of particular significance when it is realized that the occupant is also, at the time, solely under the influence of gravity (plus whatever vertical momentum forces are present). The consequence is that within this particular range of movement the occupant of the seat moves vertically up and down with the same acceleration and deceleration as the seat and hence without changing the pressure between the occupant and the seat. Such a desirable result is quite different from that obtained from conventional seat suspensions in which the vehicle drags or jerks the seat down whenever the strains imposed on the seat are negative. With the present suspension no such dragging forces tending to pull the seat downwardly are possible.

The movement of the bucket seat or saddle 5 relative to the base plate 6 is also cushioned by the hydraulic shock absorber 70. It will be noted that this shock absorber is fast to the bucket seat or saddle 5 through its bracket 73 and has a simple link connection with the rock arm 80 on one of the crank shafts. By so resisting rotation of this crank shaft under excessive impacts the shock absorber can be made effective to cushion either the rebound or downward movement of the bucket seat or saddle 5, or both.

It will be noted that downward movement of the bucket seat 5 is positively limited by the rubber bumper 85 on the base plate 6 engaging the bottom stop plate 88 of the bucket seat carrying plate 28; that sides way movement of the bucket seat 5 is limited by the radial stops 90 on the shackle ends 16 engaging the stops 92 on the stop members 91 fast to the rods 12; and that such forward movement of the bucket seat 5 as would tend to elongate axially and shorten the lives of the rubber springs 40 is prevented by the thrust collars 57 between each rear arm 25 and the plate 37 carrying these rubber springs.

It will also particularly be noted that in accordance with the present invention the shackles 14 are independent of one another, the use of the pairs of spaced bearings 20 avoiding the necessity for interconnecting the shackles, by a connecting rod or the like, at each side of the spring suspension. At the same time, these pairs of spaced bearings 20 avoid undesirable corner loading of these bearings and assure uniform loading of the suspension and a long lifetime of service. These pairs of bearings 20 also avoid the necessity of interconnecting the crank arm pivot pins 13 at each side of the suspension as by making them from a common rod. By avoiding interconnecting rods between the shackles 14 and interconnecting rods between the crank arm pivot pins 13, the posts 8a are free to move between the shackles and between the crank arms, thereby to permit of a lighter and more compact suspension.

It will also be noted that the present invention provides resilient support for the bucket seat or saddle 5 in the form of simple and sturdy rubber torsion springs which can be produced at low cost and are secured both to the seat part of the seat structure and also to the crank shafts of the suspension in a simple and effective manner and in a position where they are readily accessible and adjustable. Further, the suspension as a whole can be readily designed to have any desired characteristics within an operative range. Thus, any desired resistance curve can be obtained by making the crank arm 25 of a corresponding length and any desired frequency can be obtained by selecting a rubber spring 40 of such diameter as to provide the angular crank arm movement to provide such desired frequency. The use of the rubber springs 40 in the form shown and in relation to the crank arms 25, shackles 14 and the base part pivots 12a provides the ability to produce any desired spring rate and resistance curve in a very simple and inexpensive seat suspension.

It will also be seen that full advantage is taken throughout of simple and inexpensive welded joints and that at the same time the suspension can be taken apart in the form of simple subassemblies which can be replaced at low cost. Thus, each rubber spring 40 can be removed by the simple expedient of removing each pin 48, the bolts 35 and 56 and the threaded rod 61. The bucket seat or saddle 5 can readily be removed by removing the bolts 34, 35 and 36 for the plate 37 and removing the opposite bearings 32, 33 from engagement with the crank shaft pivots 26a. The crank shaft structures 25, 26 and shackles 14 can then be removed by removing the pins 22 and 24 and freeing the shackles 14 from the crank arm pivot pins 13. Any of these subassemblies can be replaced at low cost.

From the foregoing it will be seen that the present invention provides an improved seat suspension which is particularly applicable to rough riding vehicles and provides controlled vertical and lateral cushioning in such manner as to produce the maximum safety and comfort and leave the occupant in full control of all control levers and wheels. The seat suspension is also simple, rugged and not subject to breakdown or loss of utility and can be produced at low cost and accomplishes the specific objectives enumerated in a simple and efficient manner.

I claim:

1. In a seat structure having a seat part, a base part, a pair of horizontally spaced, generally parallel fulcrum rods journaled in one of said parts and each having at least one normally generally horizontal crank arm projecting in a direction opposite to the crank arm of the other fulcrum rod, means including at least one shackle connecting each of said crank arms with the other of said parts, a concentric torsion spring fast to each of said fulcrum rods and an anchoring member fast to each torsion spring and rotatable about the axis thereof, the combination therewith of adjustable means connecting said torsion spring anchoring members to adjust the initial tension of said torsion springs, comprising a swivel member connected to each of said anchoring members and arranged to rotate said anchoring members on being moved toward and from each other, and means operatively connecting said swivel members and arranged to move said swivel members toward and from each other to rotate said anchoring members in opposite directions.

2. In a seat structure having a seat part, a base part, a pair of horizontally spaced, generally parallel fulcrum rods journaled in one of said parts and each having at least one normally generally horizontal crank arm projecting in a direction opposite to the crank arm of the other fulcrum rod, means including at least one shackle connecting each of said crank arms with the other of said parts, a concentric torsion spring fast to each of said fulcrum rods and an anchoring member fast to each torsion spring and rotatable about the axis thereof, the combination therewith of means adjustably connecting said torsion spring anchoring members to adjust the initial tension of said torsion springs, comprising a swivel pin rotatably mounted on the rim of each of said anchoring plates to project axially therefrom, and an adjusting rod having oppositely threaded ends each end threadedly engaging a corresponding swivel pin thereby to rotate said anchoring plates in opposite directions on turning said adjusting rod.

3. In a seat structure having a seat part, a base part, a pair of horizontally spaced, generally parallel fulcrum rods journaled on one of said parts and each having a pair of spaced crank arms projecting horizontally outwardly in a direction opposite to the pair of crank arms of the other fulcrum rod and a spring connected to and resisting rotation of each of said fulcrum rods and anchored on said one of said parts, the combination therewith of means connecting said crank arms with the other of said parts, comprising means pivotally connecting the outer end of each crank arm with the other of said parts and including a shackle journaled at the outer end of at least one of said crank arms on an axis generally parallel with said fulcrum rods and extending upwardly therefrom, a pair of axially spaced coaxial bearings at the upper end of said shackle, and a pivot pin journaled in said pair of spaced bearings and pivotally connecting the upper end of said shackle with said other of said parts.

4. In a seat structure having a seat part, a base part, a pair of horizontally spaced, generally parallel fulcrum rods journaled on one of said parts and each having a pair of spaced crank arms projecting horizontally outwardly in a direction opposite to the pair of crank arms of the other fulcrum rod and a spring connected to and resisting rotation of each of said fulcrum rods and anchored on said one of said parts, the combination therewith of means connecting said crank arms with the other of said parts, comprising an individual crank arm pivot pin fast to the outer end of each of said crank arms and arranged generally equidistant from and parallel with the axis of the corresponding fulcrum rod, means pivotally connecting the outer end of each crank arm with the other of said parts and including a shackle associated with at least one of said crank arms and having a bearing in which the corresponding crank arm pivot pin is journaled, a pair of axially spaced coaxial bearings at the other end of said shackle arranged with their axis generally parallel with said axis of said corresponding fulcrum rod and at least one pivot pin fast to said other of said parts and journaled in said pair of said spaced coaxial bearings and arranged so that said shackle extends upwardly from its crank arm pivot pin to its pivot pin fast to said other of said parts.

5. In a seat structure having a seat part, a base part, a pair of horizontally spaced, generally parallel fulcrum rods journaled on one of said parts and each having a pair of spaced crank arms projecting horizontally outwardly in a direction opposite to the pair of crank arms of the other fulcrum rod and a spring connected to and resisting rotation of each of said fulcrum rods and anchored on said one of said parts, the combination therewith of means connecting said crank arms with the other of said parts, comprising an individual crank arm pivot pin fast to and projecting laterally outwardly from the outer end of each of said crank arms and arranged generally equidistant from and parallel with the axis of the corresponding fulcrum rod, a shackle associated with at least one of said crank arms and having a bearing in which the corresponding crank arm pivot pin is journaled, a pair of axially spaced, coaxial bearings at the other end of said shackle and arranged with their axis generally parallel with said axis of said corresponding fulcrum rod, a rod having each of its ends journaled in said coaxial bearings, and means connecting the part of each of said rods intermediate its bearings with said other of said parts, said shackle extending upwardly from said corresponding crank arm pivot pin to said rod.

6. In a seat structure having a seat part, a base part, a pair of horizontally spaced, generally parallel fulcrum rods journaled on one of said parts and each having a pair of spaced crank arms projecting horizontally outwardly in a direction opposite to the pair of crank arms of the other fulcrum rod and a spring connected to and resisting rotation of each of said fulcrum rods and anchored on said one of said parts, the combination therewith of means connecting said crank arms with the other of said parts, comprising an individual crank arm pivot pin fast to and projecting laterally from the outer end of each of said crank arms generally equidistant from and parallel with the axis of the corresponding fulcrum rod, a flat shackle link associated with at least one of said crank arms and having a relatively short sleeve fast to its lower end and a relatively long sleeve fast to its upper end, said sleeves being arranged generally parallel with each other, a bearing in said relatively short sleeve in which the corresponding crank arm pivot pin is journaled, a pair of axially spaced, coaxial bearings in said relatively long sleeve of said shackle link, and a pivot pin journaled in said pair of coaxial bearings and pivotally connecting the upper end of the corresponding shackle link with said other of said parts, said shankle link extending upwardly from the corresponding crank arm pivot pin to the corresponding pivot pin of the other of said parts.

7. In a seat structure having a seat part, a base part, a pair of horizontally spaced, generally parallel fulcrum rods journaled on one of said parts and each having a pair of spaced crank arms projecting horizontally outwardly in a direction opposite to the pair of crank arms of the other fulcrum rod and a spring connected to and resisting rotation of each of said fulcrum rods and anchored on said one of said parts, the combination therewith of means connecting said crank arms with the other of said parts, comprising an individual crank arm pivot pin fast to and projecting laterally from the outer end of each of said crank arms generally equidistant from and parallel with the axis of the corresponding fulcrum rod, a shackle link associated with at least one of said crank arms and having a relatively short sleeve fast to its lower end and a relatively long sleeve fast to its upper end, said sleeves being arranged generally parallel with each other, a bearing in said relatively short sleeve in which the corresponding crank arm pivot pin is journalled, a pair of axially spaced, coaxial bearings in said relatively long sleeve of said shackle link, a rod having each of its ends journaled in said pair of said coaxial bearings, and means connecting that part of said last rod intermediate the corresponding pairs of bearings with said other of said parts, said shackles extending upwardly from said crank arm pivot pins to said last rod.

8. In a seat structure having a seat part, a base part, a pair of horizontally spaced, generally parallel fulcrum rods journaled on one of said parts and each having at least one crank arm projecting horizontally outwardly in a direction opposite to the crank arm of the other fulcrum rod, means pivotally connecting the outer end of each crank arm with the other of said parts and including a shackle extending upwardly from the outer end of at least one of said crank arms and pivotally connected at its upper end to said other of said parts and a spring connected to and resisting rotation of each of said fulcrum rods and anchored on said one of said parts, the combination therewith of shock absorbing means, comprising a rotary hydraulic shock absorber having a body and an operating lever, means securing said shock absorber body to said one of said parts, an arm fast to one of said fulcrum rods, and a link connecting said shock absorber operating lever with said arm.

9. In a seat structure having a seat part, a base part, a pair of horizontally spaced, generally parallel fulcrum rods journaled on one of said parts and each having at least one crank arm projecting horizontally outwardly in a direction opposite to the crank arm of the other fulcrum rod, means pivotally connecting the outer end of each crank arm with the other of said parts and including a shackle pivotally connected at one end to the outer end of at least one of said crank arms, a pivot pin fast to said other of said parts and journaled in the other end of said shackle, and a spring connected to and resisting rotation of each of said fulcrum rods and anchored in said one of said parts, the combination therewith of means limiting the side sway of said seat part, comprising a stop member secured to said pivot pin and having a stop projecting adjacent the end of the corresponding shackle, and a stop on said last end of said shackle and arranged to engage said first stop.

10. In a seat structure having a seat part, a base part, a pair of horizontally spaced, generally parallel fulcrum rods journaled in one of said parts and each having at least one crank arm projecting horizontally outwardly in a direction opposite to the crank arm of the other fulcrum rod, means pivotally connecting the outer end of each crank arm with the other of said parts and including a shackle extending upwardly from the outer end of said crank arm and pivotally connected at its upper end to said other of said parts and a rubber torsion spring having a rubber body fast to one of said fulcrum rods and anchored on said one of said parts, the combination therewith of means preventing elongation of said rubber body lengthwise of its fulcrum rod, comprising a thrust bearing on said last fulcrum rod and interposed between said crank arm and said one of said parts.

11. In a seat structure having a seat part, a base part, a pair of horizontally spaced, generally parallel fulcrum rods journaled on one of said parts and each having at least one crank arm projecting horizontally outwardly in a direction opposite to the crank arm of the other fulcrum rod, means pivotally connecting the outer end of each crank arm with the other of said parts and including a shackle extending upwardly from the outer end of at least one of said crank arms and pivotally connected at its upper end to said other of said parts and a rubber torsion spring having a rubber body fast to one of said fulcrum rods and anchored on said one of said parts, the combination therewith of means constraining said fulcrum rods to rotate in unison, comprising an arm fast to each of said fulcrum rods in opposing relation to each other and having intermeshing teeth at their outer ends, and a thrust collar surrounding said one of said fulcrum rods and interposed between said one of said parts and the adjacent arm on said one of said fulcrum rods to prevent elongation of said rubber body lengthwise of its fulcrum rod.

References Cited in the file of this patent

UNITED STATES PATENTS

| 870,692 | Shepard | Nov. 12, 1907 |
| 1,151,561 | Bollinger | Aug. 31, 1915 |
| 2,008,209 | Herold | July 16, 1935 |
| 2,268,439 | Beebe | Dec. 30, 1941 |
| 2,358,319 | Dupee | Sept. 19, 1944 |

FOREIGN PATENTS

| 106.079 | Great Britain | May 10, 1917 |
| 695,182 | France | Sept. 29, 1930 |
| 737,621 | France | Oct. 4, 1932 |